(12) United States Patent
Chretien et al.

(10) Patent No.: US 10,627,159 B2
(45) Date of Patent: Apr. 21, 2020

(54) METHOD AND UNIT FOR SEPARATING THE LIGHT AND HEAVY COMPONENTS OF NATURAL GAS

(71) Applicant: TOTAL SA, Courbevoie (FR)

(72) Inventors: Denis Chretien, Paris (FR); Salim Azzi, Montigny le Bretonneux (FR); Claire Weiss, Vaucresson (FR)

(73) Assignee: TOTAL SA, Courbevoie (FR)

( * ) Notice: Subject to any disclaimer, the term of this patent is extended or adjusted under 35 U.S.C. 154(b) by 550 days.

(21) Appl. No.: 15/324,952

(22) PCT Filed: Jul. 7, 2015

(86) PCT No.: PCT/FR2015/051879
§ 371 (c)(1),
(2) Date: Jan. 9, 2017

(87) PCT Pub. No.: WO2016/005697
PCT Pub. Date: Jan. 14, 2016

(65) Prior Publication Data
US 2017/0211878 A1    Jul. 27, 2017

(30) Foreign Application Priority Data

Jul. 8, 2014   (FR) .................................... 14 56576

(51) Int. Cl.
*F25J 3/02*      (2006.01)
*C10L 3/10*      (2006.01)

(52) U.S. Cl.
CPC .............. *F25J 3/0233* (2013.01); *C10L 3/10* (2013.01); *C10L 3/104* (2013.01); *F25J 3/0209* (2013.01); *F25J 3/0238* (2013.01); *C10L 2290/06* (2013.01); *C10L 2290/08* (2013.01); *C10L 2290/10* (2013.01); *C10L 2290/24* (2013.01); *C10L 2290/46* (2013.01); *C10L 2290/48* (2013.01); *C10L 2290/543* (2013.01);

(Continued)

(58) Field of Classification Search
CPC .......... F25J 3/0247; F25J 3/0266; F25J 3/065; F25J 2205/30; F25J 2205/40; F25J 2220/64; C10L 3/104
See application file for complete search history.

(56) References Cited

U.S. PATENT DOCUMENTS 4,152,129 A    5/1979   Trentham et al.

FOREIGN PATENT DOCUMENTS

| DE | 36 39 779 A1 | 6/1988 |
| FR | 2 905 285 A1 | 3/2008 |

(Continued)

OTHER PUBLICATIONS

International Search Report PCT/FR2015/051879, dated Nov. 2, 2015, 4 pages.

(Continued)

*Primary Examiner* — Joel M Attey
(74) *Attorney, Agent, or Firm* — Patterson Thuente Pedersen, P.A.

(57) ABSTRACT

The invention relates to a method for the treatment of natural gas containing carbon dioxide, methane and paraffins. The method comprising: a step of extracting the paraffins from the natural gas in a paraffin-removal column, and a step of separating the carbon dioxide and the methane in a distillation column. The operation of the two columns being provided by means of the thermal coupling of said two columns using a thermal coupling heat exchanger.

14 Claims, 2 Drawing Sheets

(52) U.S. Cl.
CPC ..... *C10L 2290/544* (2013.01); *C10L 2290/56* (2013.01); *F25J 2200/04* (2013.01); *F25J 2200/06* (2013.01); *F25J 2200/40* (2013.01); *F25J 2200/74* (2013.01); *F25J 2200/78* (2013.01); *F25J 2205/02* (2013.01); *F25J 2205/04* (2013.01); *F25J 2215/60* (2013.01); *F25J 2220/60* (2013.01); *F25J 2235/80* (2013.01); *F25J 2260/80* (2013.01); *F25J 2270/12* (2013.01); *Y02C 10/12* (2013.01)

(56) References Cited

FOREIGN PATENT DOCUMENTS

| | | |
|---|---|---|
| WO | WO 83/01294 | 4/1983 |
| WO | WO 99/01707 | 1/1999 |
| WO | WO 2007/126972 A2 | 11/2007 |
| WO | WO 2007/138067 A2 | 12/2007 |
| WO | WO 2010/034627 A1 | 4/2010 |
| WO | WO 2011/135538 A2 | 11/2011 |

OTHER PUBLICATIONS

English translation of International Search Report PCT/FR2015/051879, dated Nov. 2, 2015, 3 pages.

METHOD AND UNIT FOR SEPARATING THE LIGHT AND HEAVY COMPONENTS OF NATURAL GAS

RELATED APPLICATIONS

The present application is a National Phase entry of PCT Application No. PCT/FR2015/051879, filed Jul. 7, 2015, which claims priority from FR Patent Application No. 14 56576, filed Jul. 8, 2014, said applications being hereby incorporated by reference herein in their entirety.

FIELD OF THE INVENTION

The present invention relates to the separation of light constituents and heavy constituents, more particularly carbon dioxide and paraffins, from natural gas.

PRIOR ART

Natural gas is a mixture of hydrocarbons extracted from the subsoil comprising mainly alkanes, methane and heavier compounds. These hydrocarbons constitute the exploitable resource of natural gas. However, the gas from production wells usually contains other constituents which are not exploitable, such as carbon dioxide, and which must be extracted from natural gas.

Up to relatively moderate carbon dioxide contents (approximately 20 mol %), the most usual process for the extraction of natural gas is absorption by weak basic solutions, typically amine solutions. However, above this content, the power levels required to regenerate the amine solution become considerable and put a not insignificant strain on the economic balance of natural gas purification.

Consequently, many authors have preferred to explore the route of the cryogenic distillation of natural gas and carbon dioxide, which is more energy saving. In these processes, these two constituents are separated by distillation at cold temperatures which, generally, remain above that of the triple point of carbon dioxide in order to avoid crystallization thereof.

U.S. Pat. No. 4,152,129 thus proposes distillation of natural gas and carbon dioxide at a pressure below that of the critical point of the mixture, but at a temperature above that of the triple point of carbon dioxide. The authors also propose that at least one part of the distillation column reboiling be obtained by heat exchange with the natural gas undergoing cooling.

WO 2007/126972 also provides a process for the rectification of carbon dioxide in a distillation column in order to separate it from natural gas. Reboiling is also provided by cooling of the natural gas feed. The objective of the process described here is to separate the constituents which are produced in the gas state without however being liquefied.

WO 2010/034627 proposes cooling the natural gas in two steps, with separation of the liquid and the vapour at each of the steps with a view to improving the efficiency thereof. However, the separation steps are merely separating drums, the efficiency of which is less than that of distillation columns with reflux.

The Ryan-Holmes process, developed in the 1970s for processing carbon dioxide-rich gases, makes it possible to separate the carbon dioxide from the gas and to use it in facilities for enhanced recovery of hydrocarbons from mature fields; it also makes it possible to exploit the LPGs contained in the gas. The process employs 3 to 4 separating columns and uses an additive consisting of light hydrocarbons, which turns in a loop in the process. In the first column, the carbon dioxide and methane are separated from the LPG fraction. In the second column, the carbon dioxide is separated from the methane and from the additive. Finally, in a third column, the methane is separated from the additive which is recycled to the first column.

WO 83/01294 describes an improvement to the Ryan-Holmes process by increasing the flow rate of third substances injected into the column condenser in order to improve the efficiency of the carbon dioxide-natural gas separation.

It therefore emerges from the documents mentioned that cryogenic distillation of natural gas and of carbon dioxide is well known from the prior art. However, natural gas often contains heavy constituents—essentially paraffins—the crystallization temperature of which is high and which risk freezing and blocking the equipment as cooling occurs. They should therefore be removed as simply and economically as possible before they are capable of freezing.

Patent WO 2011/135538 proposes arranging various separating drums at various temperatures in order to separate paraffins as they condense. However, this process has the drawback of fractionating cooling and of complicating the construction of the cooling exchanger line. Furthermore, a simple equilibrium is sensitive to the composition of the gas and not very operationally flexible.

Patent WO 99/01707, mentioned by the previous patent, solves the problem of the paraffins by providing for the installation of a rectification column upstream of the process in order to efficiently condense them by means of a reflux column. The reflux, in order to efficiently condense the paraffins, must be relatively cold compared with ambient temperature.

The objective of the present invention is to provide a process for separating carbon dioxide and natural gas integrated into the upstream elimination of paraffins for the purposes of mechanical simplification and energy saving.

SUMMARY OF THE INVENTION

A subject of the present invention is a process for treating a natural gas G comprising carbon dioxide, methane and paraffins, so as to obtain a gas stream enriched with methane M, a liquid stream enriched with carbon dioxide D and a liquid stream enriched with paraffins P, said process comprising the following steps:
  a) introducing the natural gas G into a deparaffinizing column (3),
  b) extracting the paraffins from the natural gas G in the deparaffinizing column (3), and recovering a top vapour stream comprising carbon dioxide and methane, and, at the column bottom, said liquid stream enriched with paraffins P,
  c) cooling the top vapour stream and then introducing into a separation unit (5),
  d) recovering a liquid stream and a vapour stream,
  e) introducing all or part of the liquid stream as reflux liquid at the top of the deparaffinizing column (3) so as to wash, in countercurrent mode, the natural gas G introduced in step a),
  f) cooling then expanding the vapour stream obtained in step d) so as to obtain a condensed stream FC and a first gas stream enriched with methane M1,
  g) introducing the condensed stream FC into a distillation column (7) so as to recover, at the top of the column, a second gas stream enriched with methane M2 and, at the column bottom, said liquid stream enriched with carbon dioxide D, h) mixing the first gas stream enriched with methane M1 and the second gas stream enriched with methane M2 so as to obtain said gas stream enriched with methane M, i) reheating a part of the liquid stream enriched with carbon dioxide D and introducing the resulting reheated stream into the distillation column (7), in which the cooling of the top vapour stream in step c) and the reheating of the part of the liquid stream enriched with carbon dioxide D in step i) are carried out by passing said top vapour stream and said part of the liquid stream enriched with carbon dioxide D through a thermal coupling heat exchanger (4).

According to one embodiment, the process is characterized in that a part of the liquid stream recovered in step d) is drawn off and injected, as feed liquid, into the distillation column (7).

According to one embodiment, the process is characterized in that the expansion in step f) is carried out in several successive expansion operations so as to result in the obtaining of several gas streams enriched with methane M1, which are then optionally heated, then mixed with the gas stream enriched with methane M2 so as to obtain the gas stream enriched with methane M.

According to one embodiment, the process is characterized in that the cooling in step c) is carried out in several successive cooling operations before the introduction into the separation unit (5).

According to one embodiment, the process is characterized in that the liquid stream enriched with paraffins P is reinjected into the distillation column (7).

According to one embodiment, the process is characterized in that the gas stream enriched with methane M is optionally heated then compressed.

According to one embodiment, the process is characterized in that a part of the liquid stream enriched with carbon dioxide D is injected into a geological reservoir.

According to one embodiment, the process is characterized in that the natural gas G comprises from 35% to 85% of carbon dioxide, from 15% to 65% of methane and at most 4% of paraffins, in particular from 40% to 70% of carbon dioxide, from 30% to 60% of methane and at most 0.5% of paraffins.

According to one embodiment, the process is characterized in that the gas stream enriched with methane M comprises less than 22% of carbon dioxide, preferably less than 20% of carbon dioxide, even more preferentially less than 18% of carbon dioxide.

According to one embodiment, the process is characterized in that the liquid stream enriched with carbon dioxide D comprises from 60% to 100% of carbon dioxide, in particular from 70% to 90% of carbon dioxide. The liquid stream enriched with carbon dioxide D may also comprise a minor proportion of dissolved hydrocarbons.

According to one embodiment, the process is characterized in that the liquid stream enriched with paraffins P comprises from 4% to 40% of paraffins, in particular from 20% to 30% of paraffins, more particularly approximately 25% of paraffins.

A subject of the present invention is also an apparatus for treating a natural gas G comprising carbon dioxide, methane and paraffins, so as to obtain a gas stream enriched with methane M, a liquid stream enriched with carbon dioxide D and a liquid stream enriched with paraffins P, characterized in that it comprises:

a deparaffinizing column (3), an inlet line (10) connected at the inlet of the deparaffinizing column (3) so as to introduce the natural gas G into the deparaffinizing column (3), a deparaffinizing column top line (11) connected at the top of the deparaffinizing column (3) so as to recover a top vapour stream and a deparaffinizing column bottom line (6) connected at the deparaffinizing column (3) bottom so as to recover a liquid stream enriched with paraffins P, a separation unit (5) fed by the deparaffinizing column top line (11), a reflux line (16) connected to the separation unit (5) so as to recover and reinject a liquid stream, as feed liquid, at the top of the deparaffinizing column (3), a vapour line (12) connected to the separation unit (5) so as to recover a vapour stream, a heat exchanger (13) and pressure reducing valves/separators (34a, 34b) fed by the vapour line (12) so as to obtain a condensed stream FC recovered in a condensate recovery line (40) and a first gas stream enriched with methane M1 recovered in one or more methane recovery lines (15a, 15b), a distillation column (7) fed by the condensate recovery line (40) comprising the condensed stream FC, a distillation column top line (8) connected at the top of the distillation column (7) so as to recover a second gas stream enriched with methane M2, a methane collection line (14) connected to the distillation column top (8) and methane recovery (15a, 15b) lines so as to recover a gas stream enriched with methane M, optionally via a compressor (17a, 17b), a distillation column bottom line (9) connected at the distillation column (7) bottom so as to recover a liquid stream enriched with carbon dioxide D, a drawing off line (9a) connected to the distillation column bottom line (9) so as to draw off and reinject a part of the liquid stream enriched with carbon dioxide D into the distillation column (7), characterized in that it also comprises a thermal coupling heat exchanger (4) through which pass the deparaffinizing column top (11) and drawing off (9a) lines, making it possible to cool the top vapour stream before introduction thereof into the separation unit (5) while at the same time reheating the drawn-off part of the liquid stream enriched with carbon dioxide D before the injection thereof into the distillation column (7).

According to one embodiment, the apparatus is characterized in that an injection line (16a) is connected to the reflux line (16) for drawing off a part of the liquid stream and injecting it, as feed liquid, into the distillation column (7).

According to one embodiment, the apparatus is characterized in that a refrigerating unit (18) and the vapour (12) and methane collection (14) lines and a first methane recovery line (15a) pass through the first heat exchanger (13) so as to cool the vapour stream while at the same time reheating the gas streams enriched with methane M and M1.

According to one embodiment, the apparatus is characterized in that the deparaffinizing column top line (11) passes through the heat exchanger (13) so as to cool the top vapour stream after it has passed through the thermal coupling heat exchanger (4) and before it is introduced into the separation unit (5).

According to one embodiment, the apparatus is characterized in that the deparaffinizing column bottom line (6) feeds the distillation column (7).

DETAILED DESCRIPTION OF THE INVENTION

The invention is now described in greater detail and in a nonlimiting manner in the description which follows.

All the pressures are given in absolute values. All the percentages are given in mole values unless otherwise mentioned.

An effort will first be made to describe the apparatus according to the invention, then the process making reference to FIGS. 1 and 2.

Figure 1:
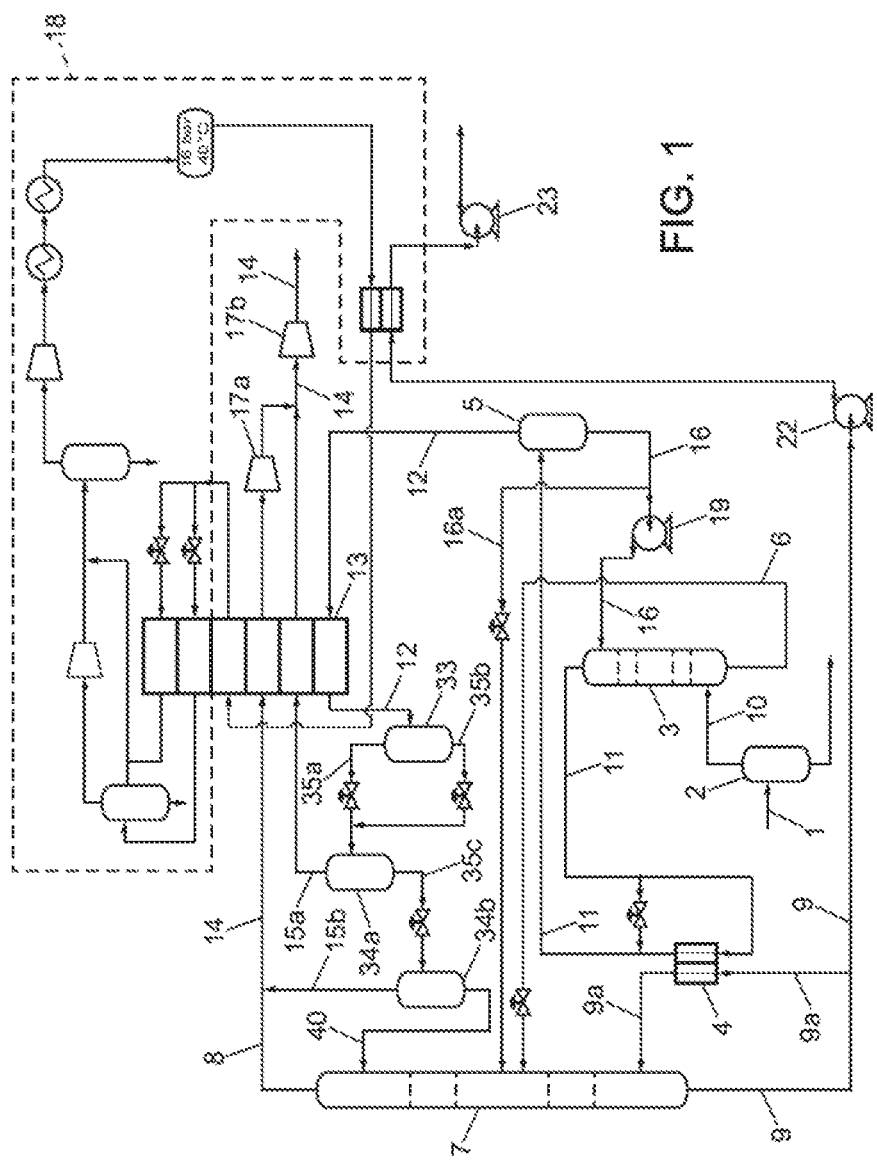
FIG. 1 presents a schematic embodiment of the invention.

With reference to FIG. 1, the apparatus according to the invention comprises a feed line 1 for feeding with natural gas G. This gas feed line 1 preferably passes through a pretreatment unit 2 which may include gas/liquid separating means aimed at removing the solid or liquid contaminants therefrom, precooling means and/or dehydrating means. An inlet line 10 is connected to the outlet of the pretreatment unit 2 so as to recover the natural gas thus pretreated. This inlet line 10 is connected at the inlet of a deparaffinizing column 3 so as to introduce the optionally pretreated natural gas G into the deparaffinizing column 3.

The term "deparaffinizing column" is intended to mean an assembly of means which is capable of extracting the paraffins from the natural gas G, by condensing them at the top and sending them in reflux into the deparaffinizing column 3. The condensation of the paraffins is obtained by cooling the top of the deparaffinizing column 3.

The term "paraffins" is intended to mean the hydrocarbons capable of crystallizing in the lines of the apparatus during the implementation of the process. These hydrocarbons are linear, branched or cyclic and typically comprise at least 6 carbon atoms.

According to one particular embodiment, the deparaffinizing column 3 is a distillation column and, more specifically, in the embodiment illustrated, it is a conventional distillation column which is devoid of bottom heating.

The operating pressure of the deparaffinizing column 3 is typically between 60 bar and 80 bar, preferably between 65 bar and 75 bar, more preferentially approximately 70 bar.

The operating temperature at the top of the deparaffinizing column 3 is typically between 0° C. and 20° C., preferably between 5° C. and 15° C., more preferentially between 10° C. and 15° C.

The temperature of the column top is determined so as to obtain a reflux sufficient for the removal of the paraffins in the vapour stream (vapour line 12) or to ensure sufficiently reboiling in the distillation column 7, the greatest amount of heat withdrawn from the top vapour stream (deparaffinizing column top line 11) being retained for the design.

A deparaffinizing column top line 11, connected at the top of the deparaffinizing column 3, makes it possible to recover a top vapour stream, while a deparaffinizing column bottom line 6, connected at the bottom of the deparaffinizing column 3, makes it possible to recover a liquid stream enriched with paraffins P.

The deparaffinizing column top line 11 passes through a thermal coupling heat exchanger 4 in which the top vapour stream is cooled, partially condensed, and then feeds a separation unit 5 with said stream.

According to one particular embodiment, the separation unit 5 is a gas/liquid separator, for example a reflux drum.

A reflux line 16 is connected at the bottom of the separation unit 5 so as to recover and reinject the liquid stream, as reflux liquid, at the top of the deparaffinizing column 3.

According to one particular embodiment, the liquid stream may be pumped in such a way that its pressure is equal to the operating pressure of the deparaffinizing column 3 before it is injected into said column. As illustrated in FIG. 1, the reflux line 16 may therefore pass through a pump 19 for pumping the liquid stream.

A vapour line 12 is connected at the top of the separation unit 5 so as to recover a vapour stream.

The vapour line 12 feeds a heat exchanger (cooling means) 13 and pressure reducing valves/separators (expanding and separating means) 34a, 34b mounted in cascade so as to obtain a condensed stream FC recovered in a condensate recovery line 40 and a gas stream enriched with methane M1 recovered in methane recovery lines 15a and 15b.

The pressure reducing valves/separators (expanding and separating means) 34a, 34b may consist of a series of flash drums mounted in cascade for carrying out staged expansion operations intended to separately produce the condensed stream FC and the gas stream enriched with methane M1.

A protecting drum 33 may be located between the heat exchanger (cooling means) 13 and the pressure reducing valves/separators (expanding and separating means) 34a, 34b.

FIG. 1 illustrates the preferential embodiment in which the apparatus comprises 2 flash drums 34a, 34b mounted in cascade. More specifically, the vapour line 12, after having passed through the heat exchanger (cooling means) 13, feeds the protecting drum 33. Connected at the outlet of the protecting drum 33 are a line for recovering gas stream 35a (at the top) and a line for recovering liquid stream 35b (at the bottom). Connected at the outlet of the first flash drum 34a are a first methane recovery line 15a for recovering a first gas stream enriched with methane M1a (at the top) and a line for recovering a second liquid stream 35c (at the bottom), said line 35c feeding the second flash drum 34b. Connected at the outlet of the second flash drum 34b are a second methane recovery line 15b for recovering a first gas stream enriched with methane M1b (at the top) and the condensate recovery line 40 for recovering the condensed stream FC (at the bottom). The second methane recovery line 15b is then connected, with the distillation column top line 8, to the methane collection line 14 so as to obtain the gas stream enriched with methane M.

The number of flash drums mounted in cascade may be other than 3. The apparatus may thus comprise from 1 to 5 flash drums 34 mounted in cascade, in particular from 2 to 3 flash drums 34 mounted in cascade.

The condensate recovery line 40 feeds a distillation column 7 with the condensed stream FC.

The term "distillation column" is intended to mean an assembly of means capable of separating the carbon dioxide from the methane with an operating temperature at the top of less than or equal to −30° C., preferably less than −40° C., even more preferentially less than −50° C.

The operating pressure of the distillation column 7 is typically between 20 bar and 40 bar, preferably between 25 bar and 35 bar, more preferentially between 27 bar and 33 bar.

The operating temperature of the top of the distillation column 7 is typically between −40° C. and −62° C., preferably between −45° C. and −61° C., more preferentially between −48° C. and −60° C.

A distillation column top line 8 is connected at the top of the distillation column 7 so as to recover a stream enriched with methane M2.

A methane collection line 14 is connected to the distillation column top 8 and methane recovery 15a and 15b lines so as to recover a gas stream enriched with methane M.

A distillation column bottom line 9 is connected at the bottom of the distillation column 7 so as to recover a liquid stream enriched with carbon dioxide D.

A drawing off line 9a is connected to the distillation column bottom line 9 so as to draw off and reinject a part of the liquid stream enriched with carbon dioxide D into the distillation column.

The drawing off line 9a passes through the thermal coupling heat exchanger 4 in which the drawn-off part of the liquid stream enriched with carbon dioxide D is reheated before it is injected into the distillation column 7.

In the apparatus according to the invention, the drawing off 9a and deparaffinizing column top 11 lines pass through the thermal coupling heat exchanger 4. The thermal coupling heat exchanger 4 makes it possible both to cool the top stream recovered at the top of the deparaffinizing column before it is introduced into the separation unit 5, and to reheat the drawn-off part of the liquid stream enriched with carbon dioxide D before it is injected into the distillation column.

Advantageously, the thermal coupling heat exchanger 4 therefore provides the heating at the bottom of the distillation column 7 while at the same time providing the cooling at the top of the deparaffinizing column 3.

According to one particular embodiment, an injection line 16a is connected to the reflux line 16 so as to draw off a part of the liquid stream recovered at the bottom of the separation unit 5 and to inject it into the distillation column 7.

According to one embodiment, a refrigeration unit 18 passes through the heat exchanger (cooling means) 13. The refrigeration unit 18 thus provides the cooling of the heat exchanger 13.

The refrigeration unit 18 and the vapour 12 and methane collection 14 lines thus pass through the heat exchanger 13 so as to cool the vapour stream recovered at the top of the separation unit 5 while at the same time reheating the gas stream enriched with methane M.

As illustrated in FIG. 1, the first methane recovery line 15a may also pass through the heat exchanger 13 so as to reheat the gas stream enriched with methane M1, before the first methane recovery line 15a is connected to the methane collection line 14.

The apparatus may also comprise compressors (compression means) 17a and 17b for compressing the gas stream enriched with methane M recovered in the methane collection line 14. As illustrated in FIG. 1, the first methane recovery line 15a may be connected to the methane collection line 14 between the compressors 17a and 17b.

According to one particular embodiment, the deparaffinizing column bottom line 6 feeds the distillation column 7 with the liquid stream enriched with paraffins P.

According to one particular embodiment, the distillation column bottom line 9 reinjects the gas stream enriched with carbon dioxide D into a geological reservoir, preferably the geological reservoir from which the natural gas G came. As illustrated by FIG. 1, the distillation column bottom line 9 can therefore pass through, in the direction of the stream, a first pump 22 for pumping said liquid stream enriched with carbon dioxide D, a heat exchanger of the refrigeration unit 18 and a second pump 23.

Figure 2:
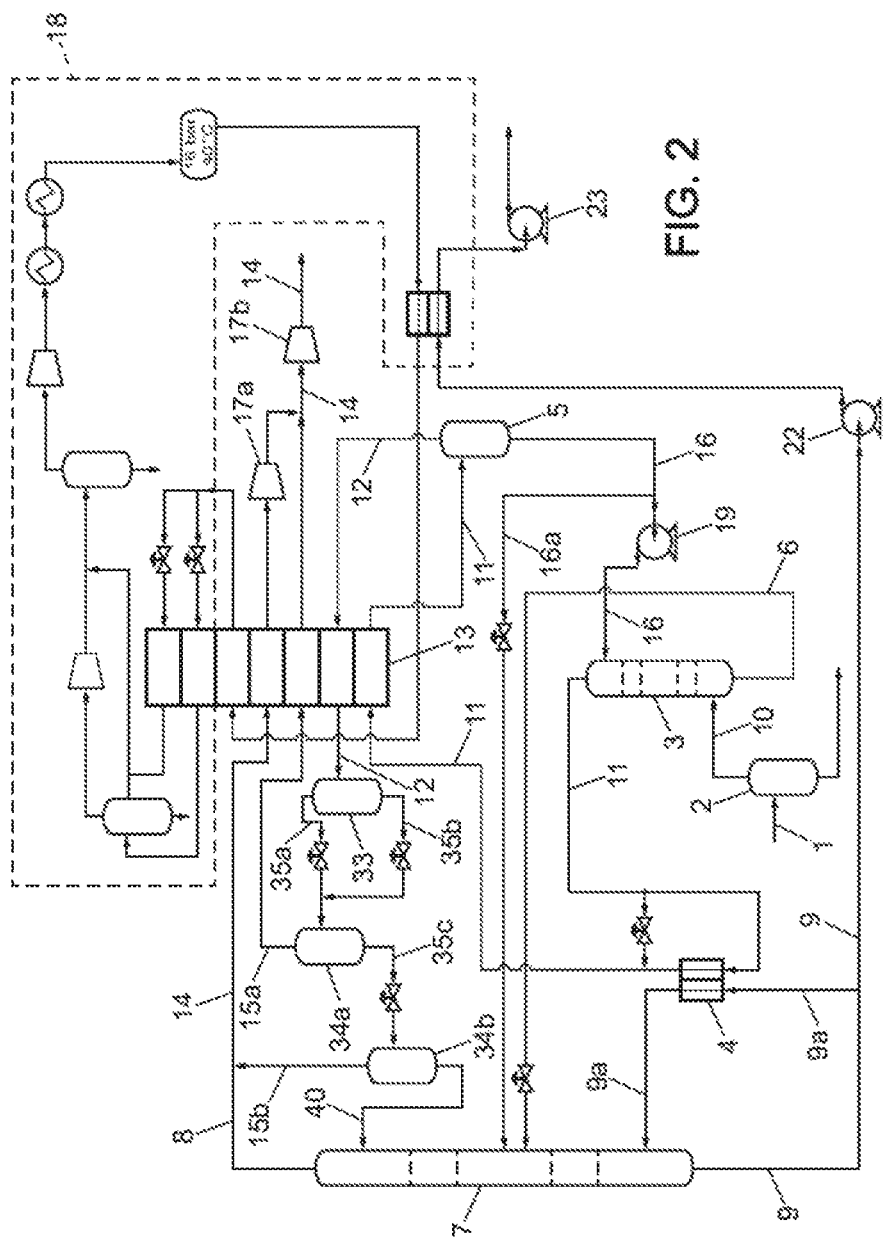
FIG. 2 presents a schematic of another embodiment of the invention.

FIG. 2 represents another embodiment which differs from that of FIG. 1 in that the deparaffinizing column top line 11 also passes through the heat exchanger 13, after said line has passed through the thermal coupling heat exchanger 4, so as to cool for a second time the top vapour stream recovered at the top of the deparaffinizing column 3.

Process

The process according to the invention applies to a natural gas G containing methane, a light impurity and a heavy impurity, the light impurity being carbon dioxide and the heavy impurity being paraffins.

The process according to the invention is applicable to natural gases intended to be sold in gas or liquefied form.

The natural gas G which is treated by means of the process according to the invention comprises at least 15% of methane or at least 25% of methane or at least 35% of methane and up to 65% of methane.

Moreover, this natural gas G comprises at least 35% of carbon dioxide, at least 45% of carbon dioxide or at least 55% of carbon dioxide or at least 65% of carbon dioxide and up to 85% of carbon dioxide. The process according to the invention is particularly advantageous for treating a natural gas comprising between 40% and 70% of carbon dioxide. This is because, below 40% of carbon dioxide, other technologies may appear more advantageous and, above 70%, the small amount of carbon dioxide that is recoverable detrimentally modifies the profitability of the process.

The natural gas G also contains ethane and hydrocarbons of C3+ type (comprising at least 3 carbon atoms), preferably in a weight proportion greater than or equal to 1% or to 2% or to 3% or to 4% or to 5% relative to the methane.

The process according to the invention is now described with reference to FIG. 1.

The natural gas G optionally undergoes one or more preliminary treatments in a pretreatment unit 2 aimed at removing the solid or liquid contaminants therefrom, at dehydrating it and/or at precooling it and/or at reducing its hydrogen sulphide content.

According to one particular embodiment, the pretreatment unit 2 is a gas/liquid separator, for example a protecting drum.

According to step a) of the process of the invention, the optionally pretreated natural gas G is introduced into a deparaffinizing column 3.

According to step b) of the process of the invention, the paraffins are extracted from the natural gas G in the deparaffinizing column 3, a top vapour stream comprising mostly carbon dioxide and methane is recovered at the column top (deparaffinizing column top line 11) and a liquid stream enriched with paraffins P is recovered at the column bottom (deparaffinizing column bottom line 6).

According to step c) of the process of the invention, the top vapour stream recovered in step b) of the process of the invention (deparaffinizing column top line 11) is then cooled and then introduced into a separation unit 5.

According to step d) of the process of the invention, a liquid stream is recovered at the bottom of the separation unit 5 (reflux line 16) and a vapour stream is recovered at the top of the separation unit 5 (vapour line 12).

The temperature of the liquid stream is below the temperature of the top vapour stream from the deparaffinizing column 3.

According to one embodiment, the vapour stream recovered at the top of the separation unit 5 in step d) of the process of the invention (vapour line 12) and the downstream streams have a paraffin crystallization temperature below −60° C., preferably below −65° C., even more preferentially below −70° C.

According to step e) of the process of the invention, all or part of the liquid stream recovered in step d) of the process of the invention (reflux line 16) is introduced, as reflux liquid, at the top of the deparaffinizing column 3 so as to wash, in countercurrent mode, the natural gas G introduced in step a) of the process of the invention.

Advantageously, the introduction of the liquid stream as reflux liquid provides the cooling of the deparaffinizing column top, thus enabling good extraction of the paraffins which, owing to their lower volatility, are condensed and sent in reflux to the base of the deparaffinizing column 3 where they dissolve in the liquid stream enriched with paraffins P.

During the duration of exploitation, the deparaffinizing column 3 may have to treat natural gases G of which the carbon dioxide content varies considerably. As it happens, the higher the carbon dioxide content, the greater the amount of liquid stream recovered. If all the liquid stream was sent to the deparaffinizing column 3, this could result in blocking of the plates of the deparaffinizing column 3.

Advantageously, by introducing all or part of the liquid stream into the deparaffinizing column 3, it is possible to have the plates thereof operate in their operating envelope whatever the carbon dioxide content of the natural gas G, to control the composition of the top vapour stream and, as has been noted, to improve the margin between the crystallization temperature of the liquid stream enriched with paraffins P and its temperature at the outlet of the deparaffinizing column 3.

The amount of liquid stream to be introduced, as reflux liquid, into the deparaffinizing column 3 can be calculated by those skilled in the art using usual process proportioning tools.

According to step f) of the process of the invention, the vapour stream recovered in step d) of the process of the invention (vapour line 12) is cooled and then expanded so as to obtain a condensed stream FC (condensate recovery line 40) and a gas stream enriched with methane M1 (methane recovery lines 15a, 15b).

The cooling of the vapour stream can be carried out by means of a heat exchanger 13. The cooling of the heat exchanger 13 may, for its part, be provided by a refrigeration unit 18 which passes through it.

Advantageously, the deparaffinizing column 3 makes it possible to reduce the concentrations of paraffins in the vapour stream recovered at the top of the separation unit 5, thus eliminating the risks of crystallization of said paraffins in the heat exchanger 13.

After having been cooled, the vapour stream (vapour line 12) undergoes expansion, for example by means of flash drums 34a, 34b mounted in cascade. The gas stream enriched with methane M1 is recovered at the top of the flash drums 34a and 34b, while the condensed stream FC is recovered at the bottom of the flash drum 34b (condensate recovery line 40).

According to step g) of the process of the invention, the condensed stream FC is introduced into a distillation column 7, preferably at the column top, so as to recover, at the column top, a gas stream enriched with methane M2 (distillation column top line 8) and, at the column bottom, a liquid stream enriched with carbon dioxide D (distillation column bottom line 9).

The expansion of the previously cooled vapour stream is carried out in such a way that the pressure of the condensed stream FC is identical to the operating pressure of the distillation column 7.

According to step h) of the process of the invention, the gas stream enriched with methane M1 obtained in step f) of the process of the invention (methane recovery lines 15a and 15b) and the gas stream enriched with methane M2 recovered in step g) of the process of the invention (distillation column top line 8) are then mixed (methane collection line 14) so as to obtain a gas stream enriched with methane M.

According to one embodiment, the gas stream enriched with methane M comprises less than 22% of carbon dioxide, preferably less than 20% of carbon dioxide, more preferentially less than 18% of carbon dioxide.

According to one particular embodiment, the liquid stream enriched with carbon dioxide D comprises from 60% to 100% of carbon dioxide, in particular from 70% to 90% of carbon dioxide. The liquid stream enriched with carbon dioxide D may also comprise a minor proportion of dissolved hydrocarbons.

According to step i) of the process of the invention, a part of the liquid stream enriched with carbon dioxide D (drawing off line 9a) is reheated and the resulting reheated stream is introduced into the distillation column 7.

The cooling of the top vapour stream (deparaffinizing column top line 11) in step c) of the process of the invention and the reheating of the part of the liquid stream enriched with carbon dioxide D (drawing off line 9a) in step i) of the process of the invention are carried out by passing said top stream and said part of the liquid stream enriched with carbon dioxide D through a thermal coupling heat exchanger 4.

Advantageously, the reheating of a part of the liquid stream enriched with carbon dioxide D makes it possible to provide the heating of the bottom of the distillation column 7. It also makes it possible to limit the losses of dissolved hydrocarbons by driving off the light dissolved hydrocarbons such as methane and ethane.

Thermal coupling is thus advantageously carried out between the two distillation 7 and deparaffinizing 3 columns. Indeed, by virtue of this thermal coupling, the amount of heat withdrawn from the top vapour stream and transmitted to the part of the liquid stream enriched with carbon dioxide D provides the cooling of the top of the deparaffinizing column 3 and the heating of the bottom of the distillation column 7.

This thermal coupling is all the more advantageous since the calculations surprisingly show that the bottom temperature of the distillation column 7 is close to the top temperature of the deparaffinizing column 3. It is consequently possible to determine, by virtue of the usual process proportioning tools, the operating conditions of the two columns for which it is possible to transfer the heat from the top of the deparaffinizing column 3 to the bottom of the distillation column 7, thus producing a particularly profitable thermal integration.

This thermal coupling is also advantageous from the point of the investment and operating costs. This is because, if the two systems for heating the distillation column 7 and for refluxing the deparaffinizing column 3 were independent, two exchangers would be necessary instead of one. In addition, since the operating temperature of the thermal coupling heat exchanger 4 is usually below ambient temperature, it would be necessary to provide a refrigeration unit, which in this case is not needed. Finally, if the systems are independent, it would be necessary to provide vapour for heating the bottom of the distillation column 7. It is therefore seen that, in addition to the savings in terms of investment, this thermal coupling allows energy savings, and therefore savings in terms of operating costs.

According to one particular embodiment, the amount of heat exchanged in the thermal coupling heat exchanger 4 is between 10 MW and 30 MW, preferably between 15 MW and 25 MW, even more preferably between 19 and 22 MW.

According to one particular embodiment, the amount of energy exchanged in the thermal coupling heat exchanger 4 is between 10 and 60, preferably between 20 and 50, even more preferably between 30 and 40 kWh/$t_{CO_2}$ of the liquid stream enriched with carbon dioxide D (distillation column bottom line 9).

According to one embodiment, a part of the liquid stream recovered in step d) is drawn off (injection line 16*a*) and injected, as feed liquid, into the distillation column 7.

By virtue of the heating at the bottom of the distillation column 7, injecting a part of the liquid stream (reflux line 16) into the distillation column 7 makes it possible to advantageously recover the light hydrocarbons, such as methane and ethane, present in said liquid stream. The recovery of these same light hydrocarbons in the deparaffinizing column 3 is less efficient since said deparaffinizing column 3 is devoid of heating at the bottom.

According to one embodiment, the expansion step f) can be carried out in several successive expansion operations, in particular using several flash drums 34 mounted in cascade. These successive expansion operations result in the obtaining of several gas streams enriched with methane M1 (methane recovery lines 15*a* and 15*b*) which are then optionally heated, then mixed with the gas stream enriched with methane M2 (distillation column top line 8) so as to obtain the gas stream enriched with methane M (methane collection line 14).

Advantageously, increasing the number of expansion operations makes it possible to more successfully separate the condensed stream FC from the gas streams enriched with methane M1 and mainly to make energy savings during the compression in (17*a*) and (17*b*). The number of successive expansion operations to be carried out can be calculated by the process proportioning techniques well known to those skilled in the art.

According to one preferred embodiment, the expansion step is carried out in between 1 and 5 successive expansion operations, preferably in between 2 and 3 successive expansion operations, more preferentially in 2 successive expansion operations.

FIG. 1 illustrates the preferential embodiment in which the expansion step is carried out in two (2) successive expansion operations, thus resulting in the obtaining of several gas streams enriched with methane M1*a* and M1*b* which are then optionally heated, then mixed with the gas stream enriched with methane M2 so as to obtain the gas stream enriched with methane M. In this embodiment, the vapour stream recovered at the top of the separation unit 5 is cooled in the heat exchanger 13, then introduced into a protecting drum 33. A gas stream is recovered at the top (gas stream recovery line 35*a*), while a liquid stream is recovered at the bottom (liquid stream recovery line 35*b*). A first gas stream enriched with methane M1*a* is recovered at the top of the flash drum 34*a* (first methane recovery line 15*a*), while a second liquid stream is recovered at the bottom of the flash drum 34*a* (second-gas-stream recovery line 35*c*) and feeds a second flash drum 34*b*. A second gas stream enriched with methane M1*b* is recovered at the top (second methane recovery line 15*b*) and the condensed stream FC is recovered at the bottom of the second flash drum 34*b* (condensate recovery line 40), and then is injected into the distillation column 7. The second gas stream enriched with methane M1*b* is mixed with the gas stream enriched with methane M2 so as to obtain the gas stream enriched with methane M (methane collection line 14). Finally, the gas streams enriched with methane M and M1*a* are heated by means of the heat exchanger 13 before being mixed. In the embodiment illustrated, the stream enriched with methane M is compressed by means of a compressor 17*a* after having been heated, but before it is mixed.

According to one particular embodiment, the cooling of step c) can be carried out in several successive cooling operations before the introduction into the separation unit 5.

In order for the thermal coupling carried out by the thermal coupling heat exchanger 4 to operate correctly, the cooling requirements at the top of the deparaffinizing column 3 need to be appropriate with respect to the heating requirements at the bottom of the distillation column 7.

Thus, above a certain carbon dioxide content in the natural gas G, the amount of liquid stream recovered at the bottom of the separation unit 5 for providing the reflux of the deparaffinizing column 3 requires an amount of heat exchanged in the thermal coupling heat exchanger 4 that exceeds the heating requirements at the bottom of the distillation column 7.

Likewise, if the temperature at which the natural gas G is introduced into the deparaffinizing column 3 is particularly high, for example in tropical countries, the amount of liquid stream recovered at the bottom of the separation unit 5 and drawn off so as to be injected, as feed liquid, into the distillation column 7 requires an amount of heat exchanged in the thermal coupling heat exchanger 4 that exceeds the heating requirements at the bottom of the distillation column 7.

According to one particular embodiment, step c) of cooling the top vapour stream recovered at the outlet of the deparaffinizing column 3 can be carried out in 2 successive cooling operations.

FIG. 2 illustrates a second embodiment. In this embodiment, the first cooling operation is carried out by means of the thermal coupling heat exchanger 4. The second cooling operation is carried out by means of the heat exchanger 13, the additional cooling requirements being covered by the refrigeration unit 18.

According to one particular embodiment, the gas stream enriched with carbon dioxide D is injected into a geological reservoir, preferably the geological reservoir from which the natural gas G comes.

Advantageously, injecting the gas stream enriched with carbon dioxide D into the geological reservoir from which the natural gas G comes makes it possible to maintain the pressure of said reservoir and thus increases the amount of natural gas G extracted from said reservoir.

According to one particular embodiment, the liquid stream enriched with paraffins P (deparaffinizing column bottom line 6) can be injected into the distillation column 7.

If the liquid stream enriched with paraffins P is not recovered as exploitable product, it can be reinjected with the gas stream enriched with carbon dioxide D into a geological reservoir, preferably the geological reservoir from which the natural gas G comes. However, this then requires a specific pump for bringing it to high pressure. By injecting the liquid stream enriched with paraffins P into the distillation column 7, this advantageously makes it possible to collect, at the same time, the liquid stream enriched with paraffins P and the liquid stream enriched with carbon dioxide D at the bottom of the distillation column (7), thus sparing the pump.

EXAMPLES

Example 1

The example refers to the embodiment of the invention in which the cooling of the top vapour stream recovered in the deparaffinizing column top line (11) is carried out in a single step, by means of the thermal coupling heat exchanger (4), and a part of the liquid stream recovered in the reflux line (16) is sent to the deparaffinizing column 3 and the other part recovered in the injection line (16a) is sent to the distillation column 7.

The natural gas G of the inlet line (10), the composition of which is indicated in Table 1, feeds the deparaffinizing column (3) at a pressure of 70 bar at 19° C.

The column top vapour stream recovered in the deparaffinizing column top line (11) passes through the thermal coupling heat exchanger (4) where it is partially condensed at a temperature of 0° C. (24%). The liquid stream and the vapour stream are separated in the separation unit (5) and recovered respectively in the reflux line (16) and the vapour line (12). The liquid stream is partly returned (42%), as reflux liquid, to the top of the deparaffinizing column (3), while a part is drawn off, in the injection line (16a), and is sent, as feed liquid, to the distillation column (7) (58%). The reflux liquid absorbs the paraffins and is extracted from the deparaffinizing column (3) by means of the deparaffinizing column bottom line (6).

Table 1 gives the material balance of the deparaffinizing column (3).

It is seen in Table 1 that the concentrations of paraffins are considerably reduced in the vapour stream of the vapour line (12), thus reducing the risks of crystallization in the downstream cryogenic equipment.

The vapour line (12) passes through the heat exchanger (13) where the vapour stream recovered is cooled and condensed at a temperature of −36° C. The liquid thus obtained is expanded in two steps (38 and 28.4 bar) down to the operating pressure of the distillation column (7) of 28.4 bar and makes it possible to obtain a condensed stream FC and two gas streams enriched with methane M1a and M1b recovered in two methane recovery lines (15a and 15b). The condensed stream FC is introduced at the top of the distillation column (7), of which it provides the reflux at −58° C.

A stream rich in methane M2 is recovered at the top in the distillation column top line (8), while a liquid stream enriched with carbon dioxide D is recovered at the bottom in the distillation column bottom line (9).

The gas streams rich in methane M2 and M1b are mixed so as to obtain a gas stream rich in methane M in the methane collection line (14).

The heating at the bottom, via the thermal coupling heat exchanger (4), of a part of the liquid stream enriched with carbon dioxide D recovered in the distillation column bottom line (9) makes it possible to separate from the carbon dioxide most of the dissolved light hydrocarbons and to recover them in the gas stream enriched with methane M2.

The heat extracted from the top vapour stream of the deparaffinizing column top line (11) in the thermal coupling heat exchanger (4) is used to heat a part of the recovered liquid stream enriched with carbon dioxide D and therefore the bottom of the distillation column (7), thus producing the thermal coupling according to the invention. The amount of heat exchanged is 20.4 MW.

If the thermal coupling is not carried out, it would be necessary to provide the distillation column (7) with this heat and to accordingly cool the top of the column (3) by means of a refrigeration unit that would consume approximately 5 electrical MW. All of these consumptions would increase the self-consumption of hydrocarbons by a factory by 0.8%, reducing the sales accordingly.

Table 2 shows the material balance of the distillation column (7).

TABLE 1

| Mole fraction | Line (6) | Line (10) | Line (11) | Line (12) | Line (16a) | Line (16) |
|---|---|---|---|---|---|---|
| Flow rate (kmol/h) | 670 | 32000 | 34891 | 26501 | 4816 | 3562 |
| T (° C.) | 18.7 | 19.0 | 13.4 | −0.2 | −0.2 | −0.2 |
| P (° C. bar a) | 70.0 | 70.0 | 69.9 | 69.4 | 69.4 | 69.4 |
| $N_2$ | 0.0006 | 0.0030 | 0.0029 | 0.0034 | 0.0011 | 0.0011 |
| $CO_2$ | 0.4300 | 0.4785 | 0.4867 | 0.4668 | 0.5496 | 0.5496 |
| $H_2S$ | 0.0003 | 0.0002 | 0.0002 | 0.0002 | 0.0002 | 0.0002 |
| METHANE | 0.1791 | 0.4024 | 0.3913 | 0.4357 | 0.2511 | 0.2511 |
| ETHANE | 0.0680 | 0.0541 | 0.0550 | 0.0515 | 0.0662 | 0.0662 |
| PROPANE | 0.0949 | 0.0360 | 0.0381 | 0.0288 | 0.0677 | 0.0677 |
| IBUTANE | 0.0272 | 0.0060 | 0.0065 | 0.0039 | 0.0144 | 0.0144 |
| BUTANE | 0.0646 | 0.0120 | 0.0129 | 0.0074 | 0.0302 | 0.0302 |
| IPENTANE | 0.0190 | 0.0020 | 0.0021 | 0.0009 | 0.0058 | 0.0058 |
| PENTANE | 0.0355 | 0.0030 | 0.0030 | 0.0011 | 0.0087 | 0.0087 |
| C6 | 0.0502 | 0.0020 | 0.0013 | 0.0003 | 0.0045 | 0.0045 |
| Benzene | 0.0028 | 0.0001 | 0.0001 | 0.0000 | 0.0002 | 0.0002 |
| C7 | 0.0185 | 0.0004 | 0.0001 | 0.0000 | 0.0003 | 0.0003 |
| C8 | 0.0066 | 0.0001 | 0.0000 | 0.0000 | 0.0000 | 0.0000 |
| C9 | 0.0024 | 0.0001 | 0.0000 | 0.0000 | 0.0000 | 0.0000 |
| C10 | 0.0006 | 0.0000 | 0.0000 | 0.0000 | 0.0000 | 0.0000 |

TABLE 2

| Mole fraction | Line (6) | Line (8) | Line (9) | Line (12) | Line (14) | Line (15a) | Line (16a) |
|---|---|---|---|---|---|---|---|
| Flow rate (kmol/h) | 670 | 6395 | 15148 | 26501 | 8514 | 8339 | 4819 |
| T (° C.) | 18.75 | −57.4 | −7.0 | −0.2 | −57.6 | −51.3 | −0.2 |
| P (bar a) | 70.0 | 28.7 | 28.8 | 69.4 | 28.4 | 38.0 | 69.4 |
| $N_2$ | 0.0006 | 0.0021 | 0.0000 | 0.0034 | 0.0030 | 0.0084 | 0.0011 |
| $CO_2$ | 0.4300 | 0.1992 | 0.7872 | 0.4668 | 0.1981 | 0.2041 | 0.5496 |
| $H_2S$ | 0.0003 | 0.0000 | 0.0003 | 0.0002 | 0.0000 | 0.0000 | 0.0002 |
| METHANE | 0.1791 | 0.7640 | 0.0050 | 0.4357 | 0.7644 | 0.7548 | 0.2511 |
| ETHANE | 0.0680 | 0.0298 | 0.0825 | 0.0515 | 0.0296 | 0.0273 | 0.0662 |
| PROPANE | 0.0949 | 0.0043 | 0.0712 | 0.0288 | 0.0043 | 0.0046 | 0.0677 |
| IBUTANE | 0.0272 | 0.0002 | 0.0124 | 0.0039 | 0.0002 | 0.0002 | 0.0144 |
| BUTANE | 0.0646 | 0.0003 | 0.0250 | 0.0074 | 0.0003 | 0.0004 | 0.0302 |
| IPENTANE | 0.0190 | 0.0000 | 0.0042 | 0.0009 | 0.0000 | 0.0000 | 0.0058 |
| PENTANE | 0.0355 | 0.0000 | 0.0063 | 0.0011 | 0.0000 | 0.0000 | 0.0087 |
| C6 | 0.0502 | 0.0000 | 0.0042 | 0.0003 | 0.0000 | 0.0000 | 0.0045 |
| Benzene | 0.0028 | 0.0000 | 0.0002 | 0.0000 | 0.0000 | 0.0000 | 0.0002 |
| C7 | 0.0185 | 0.0000 | 0.0009 | 0.0000 | 0.0000 | 0.0000 | 0.0003 |
| C8 | 0.0066 | 0.0000 | 0.0003 | 0.0000 | 0.0000 | 0.0000 | 0.0000 |
| C9 | 0.0024 | 0.0000 | 0.0001 | 0.0000 | 0.0000 | 0.0000 | 0.0000 |
| C10 | 0.0006 | 0.0000 | 0.0000 | 0.0000 | 0.0000 | 0.0000 | 0.0000 |

Example 2

Example 2 relates to the variant of the invention as illustrated by FIG. 2.

The natural gas G of the inlet line (10), the composition of which is indicated in Table 3, feeds the deparaffinizing column (3) at a pressure of 68 bar and 40° C.

The column top vapour stream recovered in the deparaffinizing column top line (11) passes through the thermal coupling heat exchanger (4) where it is partially condensed (27%) at a temperature of 3.2° C. Since the carbon dioxide content in the gas G is considerable, the amounts condensed are large. The amount of heat to be extracted from the stream of the deparaffinizing column top line (11) exceeds the heating requirements of the distillation column (7) and is partially extracted in the heat exchanger (13). The reflux required for the deparaffinizing in the deparaffinizing column (3) is achieved in this way.

The liquid stream and the vapour stream are separated in the separation unit (5), and recovered respectively in the reflux line (16) and the vapour line (12). The liquid stream is partly (70%) returned, as reflux liquid, to the top of the deparaffinizing column (3), while a part is withdrawn, in the injection line (16a), and sent, as feed liquid, to the distillation column (7) (30%). The reflux liquid absorbs the paraffins and is extracted from the deparaffinizing column (3) by means of the deparaffinizing column bottom line (6).

Table 3 gives the material balance of the deparaffinizing column (3).

TABLE 3

| Mole fraction | Line (6) | Line (10) | Line (11) | Line (12) | Line (16a) | Line (16) | Line 11 after the thermal coupling heat exchanger (4) and before the heat exchanger (13) | Line 11 after the heat exchanger (13) |
|---|---|---|---|---|---|---|---|---|
| Flow rate (kmol/h) | 201 | 33964 | 46263 | 28330 | 5432 | 12500 | 46263 | 46263 |
| T (° C.) | 34.9 | 40 | 10 | 0 | 0 | 0 | 4.2 | 0 |
| P (bar a) | 68 | 68 | 67.9 | 66.9 | 67 | 67 | 67.4 | 66.9 |
| $N_2$ | 0.0110 | 0.0927 | 0.0752 | 0.1059 | 0.0266 | 0.0266 | 0.0752 | 0.0752 |
| $CO_2$ | 0.4487 | 0.6326 | 0.6741 | 0.6051 | 0.7832 | 0.7832 | 0.6741 | 0.6741 |
| $H_2S$ | 0.0017 | 0.0012 | 0.0014 | 0.0011 | 0.0018 | 0.0018 | 0.0014 | 0.0014 |
| METHANE | 0.0734 | 0.2234 | 0.1938 | 0.2458 | 0.1117 | 0.1117 | 0.1938 | 0.1938 |
| ETHANE | 0.0283 | 0.0251 | 0.0256 | 0.0248 | 0.0267 | 0.0267 | 0.0256 | 0.0256 |
| PROPANE | 0.0357 | 0.0135 | 0.0162 | 0.0113 | 0.0238 | 0.0238 | 0.0162 | 0.0162 |
| IBUTANE | 0.0116 | 0.0021 | 0.0029 | 0.0015 | 0.0050 | 0.0050 | 0.0029 | 0.0029 |
| BUTANE | 0.0327 | 0.0045 | 0.0063 | 0.0030 | 0.0113 | 0.0113 | 0.0063 | 0.0063 |
| IPENTANE | 0.0344 | 0.0016 | 0.0023 | 0.0008 | 0.0048 | 0.0048 | 0.0023 | 0.0023 |
| PENTANE | 0.0482 | 0.0014 | 0.0019 | 0.0005 | 0.0040 | 0.0040 | 0.0019 | 0.0019 |
| C6 | 0.1615 | 0.0011 | 0.0004 | 0.0001 | 0.0009 | 0.0009 | 0.0004 | 0.0004 |
| Benzene | 0.0139 | 0.0001 | 0.0000 | 0.0000 | 0.0000 | 0.0000 | 0.0000 | 0.0000 |
| C7 | 0.0687 | 0.0004 | 0.0000 | 0.0000 | 0.0000 | 0.0000 | 0.0000 | 0.0000 |
| C8 | 0.0220 | 0.0001 | 0.0000 | 0.0000 | 0.0000 | 0.0000 | 0.0000 | 0.0000 |
| C9 | 0.0068 | 0.0000 | 0.0000 | 0.0000 | 0.0000 | 0.0000 | 0.0000 | 0.0000 |
| C10 | 0.0017 | 0.0000 | 0.0000 | 0.0000 | 0.0000 | 0.0000 | 0.0000 | 0.0000 |

It is seen again in Table 3 that the concentrations of paraffins are considerably reduced in the vapour stream of the vapour line (12), thus reducing the risks of crystallization in the downstream cryogenic equipment.

As in Example 1, the heat extracted from the top vapour stream of the deparaffinizing column top line (11) in the thermal coupling heat exchanger (4) is used to heat a part of the liquid stream enriched with carbon dioxide D before it is introduced into the distillation column (7), thus performing the thermal coupling according to the invention. The amount of heat exchanged is 20.1 MW, close to the 20.4 MW of the principal embodiment.

The additional heat load due to the passing of the top vapour stream of the deparaffinizing column top line (11) through the heat exchanger (13) is 14.6 MW.

The vapour line (12) passes through the heat exchanger (13) where the vapour stream recovered is cooled and condensed at a temperature of −37° C. The resulting liquid is expanded in two steps (38 and 32.4 bar) down to the operation pressure of the distillation column (7) of 32.4 bar at −48° C.

Table 4 shows the material balance of the distillation column (7).

TABLE 4

| Mole fraction | Line (8) | Line (9) | Line (12) | Line (14) | Line (15) | Line (16a) |
|---|---|---|---|---|---|---|
| Flow rate (kmol/h) | 3905 | 18643 | 28330 | 4458 | 10661 | 5432 |
| T (° C.) | −45.5 | −3.5 | 0 | −45.8 | −46.6 | 0 |
| P (bar a) | 32.4 | 32.8 | 66.9 | 32.4 | 38 | 66.9 |
| $N_2$ | 0.1011 | 0.0000 | 0.1059 | 0.1148 | 0.2470 | 0.0266 |
| $CO_2$ | 0.2989 | 0.9268 | 0.6051 | 0.2961 | 0.2625 | 0.7832 |
| $H_2S$ | 0.0004 | 0.0019 | 0.0011 | 0.0004 | 0.0004 | 0.0018 |
| METHANE | 0.5731 | 0.0050 | 0.2458 | 0.5623 | 0.4663 | 0.1117 |
| ETHANE | 0.0225 | 0.0287 | 0.0248 | 0.0224 | 0.0201 | 0.0267 |
| PROPANE | 0.0035 | 0.0215 | 0.0113 | 0.0034 | 0.0032 | 0.0238 |
| IBUTANE | 0.0002 | 0.0036 | 0.0015 | 0.0002 | 0.0002 | 0.0050 |
| BUTANE | 0.0003 | 0.0077 | 0.0030 | 0.0003 | 0.0003 | 0.0113 |
| IPENTANE | 0.0000 | 0.0025 | 0.0008 | 0.0000 | 0.0000 | 0.0048 |
| PENTANE | 0.0000 | 0.0020 | 0.0005 | 0.0000 | 0.0000 | 0.0040 |
| C6 | 0.0000 | 0.0003 | 0.0001 | 0.0000 | 0.0000 | 0.0009 |
| Benzene | 0.0000 | 0.0000 | 0.0000 | 0.0000 | 0.0000 | 0.0000 |
| C7 | 0.0000 | 0.0000 | 0.0000 | 0.0000 | 0.0000 | 0.0000 |
| C8 | 0.0000 | 0.0000 | 0.0000 | 0.0000 | 0.0000 | 0.0000 |
| C9 | 0.0000 | 0.0000 | 0.0000 | 0.0000 | 0.0000 | 0.0000 |
| C10 | 0.0000 | 0.0000 | 0.0000 | 0.0000 | 0.0000 | 0.0000 |

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A process for treating a natural gas comprising carbon dioxide, methane and paraffins, so as to obtain a gas stream enriched with methane, a liquid stream enriched with carbon dioxide and a liquid stream enriched with paraffins, said process comprising the following steps of:
   a) introducing the natural gas into a deparaffinizing column,
   b) extracting the paraffins from the natural gas in the deparaffinizing column, and recovering a top vapour stream comprising carbon dioxide and methane, at the column top, and said liquid stream enriched with paraffins at the column bottom,
   c) cooling the top vapour stream then introducing it into a separation unit,
   d) recovering a liquid stream from the separation unit and a vapour stream from the separation unit,
   e) introducing all or part of the liquid stream from the separation unit, as reflux liquid, at the top of the deparaffinizing column so as to wash, in countercurrent mode, the natural gas introduced in step a),
   f) cooling then expanding the vapour stream from the separation unit recovered in step d) so as to obtain a condensed stream and a first gas stream enriched with methane M1,
   g) introducing the condensed stream into a distillation column so as to recover, at the top of the column, a second gas stream enriched with methane M2 and, at the column bottom, said liquid stream enriched with carbon dioxide,
   h) mixing the first gas stream enriched with methane M1 and the second gas stream enriched with methane M2 so as to obtain said gas stream enriched with methane,
   i) reheating a part of the liquid stream enriched with carbon dioxide and introducing the resulting reheated stream into the distillation column,
   in which the cooling of the top vapour stream in step c) and the reheating of the part of the liquid stream enriched with carbon dioxide in step i) are carried out by passing said top vapour stream and said part of the liquid stream enriched with carbon dioxide through a thermal coupling heat exchanger.

2. The process according to claim 1, wherein a part of the liquid stream recovered in step d) is withdrawn and injected, as feed liquid, into the distillation column.

3. The process according to claim 1, wherein the cooling of step c) is carried out in several successive cooling operations before the introduction into the separation unit (5).

4. The process according to claim 1, wherein the gas stream enriched with methane is heated then compressed before being further mixed with a gas stream from a first methane gas recovery line.

5. The process according to claim 1, wherein a part of the liquid stream enriched with carbon dioxide is injected into a geological reservoir.

6. The process according to claim 1, wherein the natural gas comprises from 35% to 85% of carbon dioxide, from 15% to 65% of methane and at most 4% of paraffins, the percentages being given in mole values.

7. The process according to claim 1, wherein the gas stream enriched with methane comprises less than 22% of carbon dioxide, the percentages being given in mole values.

8. The process according to claim 1, wherein the liquid stream enriched with carbon dioxide comprises from 60% to 100% of carbon dioxide, the percentages being given in mole values.

9. The process according to claim 1, wherein the liquid stream enriched with paraffins comprises from 4% to 40% of paraffins, the percentages being given in mole values.

10. An apparatus for treating a natural gas comprising carbon dioxide, methane and paraffins, so as to obtain a gas stream enriched with methane, a liquid stream enriched with carbon dioxide and a liquid stream enriched with paraffins, wherein said apparatus comprises:
  a deparaffinizing column,
  an inlet line connected at the inlet of the deparaffinizing column so as to introduce the natural gas into the deparaffinizing column,
  a deparaffinizing column top line connected at the top of the deparaffinizing column so as to recover a top vapour stream and a deparaffinizing column bottom line connected at the bottom of the deparaffinizing column so as to recover a liquid stream enriched with paraffins,
  a separation unit fed by the deparaffinizing column top line,
  a reflux line connected to the separation unit so as to recover and reinject a liquid stream, as reflux liquid, as the top of the deparaffinizing column,
  a vapour line connected to the separation unit so as to recover a vapour stream,
  a heat exchanger and pressure reducing valves/separators fed by the vapour line so as to obtain a condensed stream recovered in a condensate recovery line and a first gas stream enriched with methane M1 recovered in a methane recovery line,
  a distillation column fed by the condensate recovery line,
  a distillation column top line connected at the top of the distillation column so as to recover a second gas stream enriched with methane M2,
  a methane collection line connected to the distillation column top line and the methane recovery line so as to recover a gas stream enriched with methane,
  a distillation column bottom line connected at the bottom of the distillation column so as to recover a liquid stream enriched with carbon dioxide,
  a drawing off line connected to the distillation column bottom line so as to draw off and reinject a part of the liquid stream enriched with carbon dioxide into the distillation column,
  wherein said apparatus also comprises a thermal coupling heat exchanger through which pass the deparaffinizing column top line and the drawing off line configured to cool the top vapour stream before introduction thereof into the separation unit while at the same time reheating the drawing-off part of the liquid stream enriched with carbon dioxide before injection thereof into the distillation column.

11. The apparatus according to claim 10, wherein an injection line is connected to the reflux line for drawing off a part of the reflux liquid stream and injecting it, as feed liquid, into the distillation column.

12. The apparatus according to claim 10, wherein a refrigeration unit and the vapour line, the methane collection line, and a first methane recovery line passes through the heat exchanger so as to cool the vapour stream while at the same time reheating the gas stream enriched with methane and the first gas stream enriched with methane M1.

13. The apparatus according to claim 10, wherein the deparaffinizing column top line passes through the heat exchanger so as to cool the top vapour stream after passing through the thermal coupling heat exchanger and before it is introduced into the separation unit.

14. The apparatus according to claim 10, wherein the deparaffinizing column bottom line feeds the distillation column.

* * * * *